United States Patent [19]
Miraldi

[11] 3,784,820
[45] Jan. 8, 1974

[54] TOMOGRAPHIC SCANNING PROCESS

[75] Inventor: Floro D. Miraldi, Cleveland Heights, Ohio

[73] Assignee: Case Western Reserve University, Cleveland, Ohio

[22] Filed: June 25, 1971

[21] Appl. No.: 156,951

Related U.S. Application Data

[62] Division of Ser. No. 48,166, June 22, 1970, Pat. No. 3,688,113.

[52] U.S. Cl. ............................................ 250/362
[51] Int. Cl. ........................................... G01j 39/18
[58] Field of Search ..................... 250/71.55, 61.5

[56] References Cited
UNITED STATES PATENTS

| | | | |
|---|---|---|---|
| 3,432,660 | 3/1969 | Anger | 250/61.5 |
| 3,631,244 | 12/1971 | Bergstedt | 250/61.5 |

OTHER PUBLICATIONS

"Tomographic Gamma Ray Scanner" by Anger, UCRL 16899 May 1966 page 7
"Longitudinal Tomographic," by McAfee et al., Journal of Nuclear Medicine, Vol. 10, No. 10 pages 654–658 October 1969

*Primary Examiner*—Walter Stolwein
*Assistant Examiner*—Harold A. Dixon
*Attorney*—Fay, Sharpe & Mulholland

[57] ABSTRACT

A radioisotope device having a collimator delimits radiation from a source. A scintillation crystal having a rectangular cross-section and a generally elongated shape receives radiation after it passes through the collimator and changes it to visible light at each point by a process known as scintillation. Photomultiplier tubes at each end of the scintillation crystal convert the light to electrical pulses. The amplitudes of electrical pulses are converted to logarithms of the amplitudes and summed. A pulse height selector chooses only the sums of those logarithms desired for observation. The logarithms of the amplitudes are also subtracted to find the location of the scintillation in the scintillation crystal.

Means are also provided for moving the source of radiation relative to the collimator. A recording means stores information concerning the relative positions of the source and the collimator during the time radiation is received. Information from a plurality of scans allows a determination of a pattern of the radiation at different depths and areas within the source.

It is also possible to use a plurality of collimators and scintillation crystals and a single scan to determine radiation patterns at multiple depths within the source.

10 Claims, 15 Drawing Figures

TOMOGRAPHIC SCANNING PROCESS

This is a division of application Ser. No. 48,166, now U.S. Pat. No. 3,688,113.

BACKGROUND OF THE INVENTION

In order to study human or other organs the practice has developed of making such organs radioactive. The patient usually takes medication containing amounts of radioactive material.

The radioactive material which is commonly used gives off gamma rays. It is usually easier and more effective to change the gamma rays to visible light radiation than to try to detect the gamma rays directly. However, the detection and conversion of gamma rays has its own difficulties. These problems include the discrimination between radiation resulting from photoelectric effect and compton effect and a determination of the location of the radiation within the source of radiation.

Many types of radiation scanners have been developed in order to detect a radiation pattern within the organs. In this respect, the following articles have been published:

1. Anger, H. O.: The Scintillation Camera for Radioisotope Localization. [In] Radioisotope in der Localizationsdiagnostik, ed. by G. Hoffman and K. Scheer. Stuttgard, F. K. Schottauer, 1967.
2. Anger, H. O.: Tomographic Gamma-Ray Scanner with Simultaneous Readout of Several Planes. UCRL-16899 Rev., April 1967.
3. Brownell, G. L.: Theory of Radioisotope Scanning. Internat. J. Appl. Radiation & Isotopes 3: 181–192, August 1958.
4. Cassen, B., Gass, H., and Crandall, P.: Improved-Resolution Fast-Section Scanner. (abst.) J. Nuclear Med. 9:307, June 1968.
5. Cassen, B.: Nonfocused Collimator Channel Systems in Cross-Time Correlation Three-Dimensional Scanning. (abst.) J. Nuclear Med. 10:391, June 1969.
6. Davis, T. P., and Martone, R. J.: The Hybrid Radioisotope Scanner. J. Nuclear Med. 7:114–127, February 1966.
7. Glass, H. I.: A Depth-Focusing Collimator for the Investigation of the Brain Cortex. [In] Medical Radiosiotope Scanning: Proc.Symp. on M. Radioisotope Scanning, Athens, April 20–24, 1964. Vienna, IAEA, 1965, Vol. I, pp. 243–252.
8. Hisada, K. -I., Hiraki, T., Ohba, S., and Matsudaira, M.: Simultaneous Performance of Isosensitive Scanning and Bilaminoscanning. Radiology 88:129–134, January 1957.
9. Kuhl, D. E., and Edwards, R. Q.: Image Separation Radioisotope Scanning. Radiology 80:653–661, April 1963.
10. Kuhl, D. E., and Edwards, R. Q.: Rapid Brain Scanner with Self-Contained Computer and CRT Display for Both Rectilinear and Transverse Section Viewing. (abst.) J. Nuclear Med. 9:332, June 1968.
11. McRae, J., and Anger, H. O.: Initial Clinical Results Obtained with the Multiplane Tomographic Gamma-Ray Scanner. (abst.) U. Nuclear Med. 10:356–257, June 1969.
12. Miraldi, F., DiChiro, G., and Skoff, G.: Evaluation of Current Methods of Radioisotope Tomography and Design of a New Device: The Tomoscanner. (abst.) K. J. Nuclear Med. 10: 358–359, June 1969.
13. Patton, J., Brill, A. B., Erickson, J., Cook, W. E., and Johnston, R. E.: A New Approach to Mapping Three-Dimensional Radionuclide Distributions. (abst.) J. Nuclear Med. 10:363, June 1969.
14. Rotenberg, A. D.: Body Scanning. Ph.D. Thesis, Univ. of Toronto, November 1962, pp. 73–76.

Past radiation sensitive scanners have been able to obtain relatively good resolution but have inherent limitations. They are normally designed to be focused at a single point or very small area passing through the source. Investigation of a large source requires an excessive amount of time in order to scan the entire area under observation. As a practical matter, patients may tire and move during the scan thus jeopardizing the investigation.

Scintillation cameras which generally observe an area rather than a point have sought to solve the excessive time problem of the scanner. They have been relatively successful in this respect since they take much less time than a scanner to observe a given area. However, the scintillation camera such as that disclosed in the Anger U.S. Pat. No. 3,011,057 also has its limitations. Because it must observe a relatively large two-dimensional area at one time, the resolution is not as good as a scanner. This results because the phototubes in the Anger patent observe a large scintillation crystal and it views some scattering of light.

The present invention relates to a radiation scanning device and, more particularly, to a device which is well adapted for mapping radioisotope distributions within a human body. A number of schemes have been developed for utilizing gamma detecting scintillation crystals for scanning selected portions of the human body to determine radioisotope distributions. Most schemes however produce a two-dimensional representation of the three-dimensional distribution. This results in a decreased resolution of a lesion because of superimposing and overlying activity. To enhance the resolution, the use of body-section scanning is proposed. The layer-by-layer analysis which can be attained by tomoscanning allows a significant enhancement of detail and contrast by elimination of the superimposing and obscuring activity. Although many approaches to section scanning have been suggested and tried, all may be grouped into the general procedure of scanning with collimators inclined to the plane of interest. This method was initiated by others and often goes by the name "longitudinal section scanning." The general procedure is to obtain separate scans with a collimator at various angles to the plane of interest. The resulting separate scans are superimposed to give a reinforcement at a given plane.

This invention has combined the advantages of a camera and a scanner in order to provide a three-dimensional well defined image which can be formed in a relatively short amount of time. This invention provides for the use of an elongated collimator and a scintillation crystal which usually view the entire width of the source. A single longitudinal scan enables the collimator to view the entire area of the source. A second scan from a different direction provides enough additional information for determining the depth of the source.

This invention also provides a means and technique for detecting the locations of scintillations in a crystal with a high degree of accuracy in order to provide good resolution of the source of the radiation. This improved resolution is obtained by means of a system utilizing logarithms of the amplitudes of the pulses emanating from photomultiplier tubes.

SUMMARY OF THE INVENTION

This radiation sensitive device includes a means for detecting radiation from a radioactive source which results in at least two outputs of amplitudes of electrical pulses which are derived from radiation received by a scintillation crystal. A means for operating on amplitudes of the electrical pulses produces substantially constant outputs for radiation of given energy levels regardless of the position of scintillations in the crystal. A means for selecting only a desired range of the outputs filters the outputs. Means for determining the location of scintillations in the crystal specifies the source of radiation.

A tomographic scanning process determines patterns of radioactivity from a source. A first scan is made while sensing the radiation and recording information concerning the relative velocity of the detector and source. A similar second scan is made and the information from both scans is combined to determine patterns of radiation from different depths within the source.

PREFERRED EMBODIMENT

General System

Figure 1:
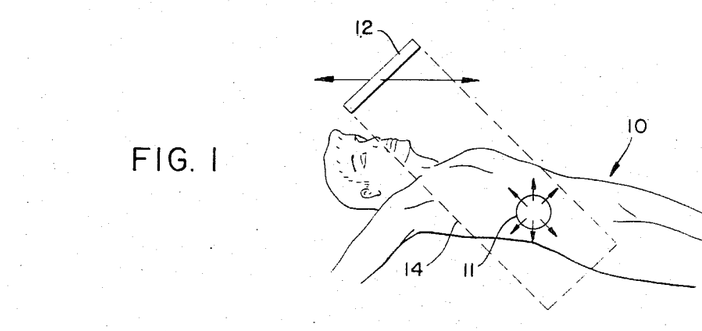
FIG. 1 is a schematic representation of the use of the invention of this application.

As illustrated in FIG. 1, this invention generally relates to a device for sensing radiation from a source which can be an organ of a human body. An individual will, after taking a radioactive substance in medication, have a concentration of radiation in a given organ 11. The radiation emanating from the source 11, usually gamma rays, is sensed by a detector 12. In a given position, the detector 12 has a rectangular field 14 of sensing. In actual practice, the plane 14 has a given depth so there is actually a wedge-shaped channel viewing the source at any given moment.

The detector 12 is able to move in either direction across the source and thus detect the radiation. The detector 12 has a definite viewing angle that can be varied in order to view the source from different directions. As explained in more detail hereinafter viewing the radioactive source from different directions allows an investigation of different reference planes within the source. This type of study is generally referred to as tomography.

Figure 2:
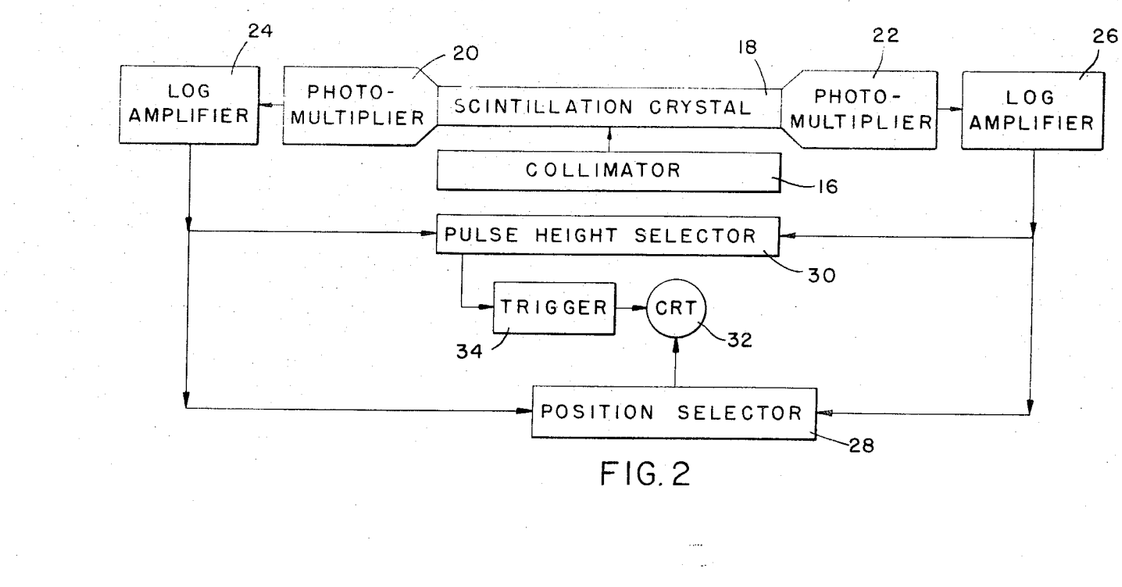
FIG. 2 is a block diagram of the elements of this radiation sensitive device.

A block diagram of the system for the tomographic scanner of this invention is illustrated in FIG. 2. A collimator 16 intercepts radiation normally gamma rays from a source and allows transmission of part to a scintillation crystal 18 which is usually in close proximity thereto. The scintillation crystal converts to gamma rays to visible light. Means for converting the visible light to electrical pulses includes photomultiplier tubes 20 and 22 which are located at each end of the scintillation crystal 18. The electrical pulses are subsequently transmitted respectively to the amplifiers 24 and 26. The collimator, scintillation crystal, means for converting the visible light to electrical pulses and necessary physical and/or electrical connections make up the essentials of means for detecting radiation from a source of radiation.

The amplifiers 24 and 26 transmit their signals to a pulse height selector and a position selector which combines for a read out on a cathode ray tube. The amplifiers as will be explained in more detail below change the amplitudes of the electrical pulses from the photomultiplier tubes to logarithms of the amplitudes before transmitting them to the pulse height selector. The amplifier which converts the amplitudes to logarithms of the amplitudes, pulse height selector and the necessary electrical connections make up a means for operating on the output of the amplitudes of the electrical pulses in order to produce a substantially constant output for radiation of given energy levels regardless of the position of scintillations in the crystals.

Means for determining the positions of scintillations in the crystal include a position selector 28 which is basically circuitry for subtracting the logarithms transmitted by the amplifier 24 and 26. The position selector 28 further includes mechanisms for scanning the source while recording information concerning the radiation and relative positions of the scanner and source.

A known circuit 34 triggers a cathode ray tube 32 when the pulse height selector accepts a signal. Simultaneously the position selector gives information to the cathode ray tube 32 in order to properly place the pulse on coordinate axes.

Collimator

Figure 3:
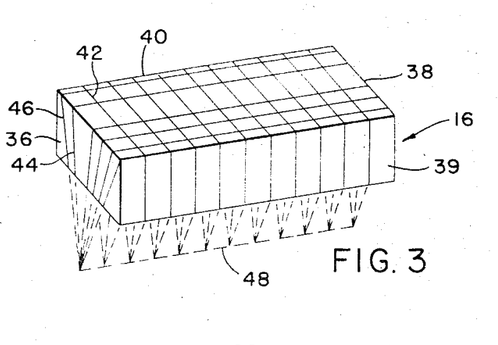
FIG. 3 is a perspective view of the collimator used in this system.

The collimator 16, illustrated in FIG. 3 has a front 36, rear 38 and sides 39 and 40. Septa 42 are generally parallel to each other from the front 36 and to the rear 38. In this respect the septa form a non-focusing system in the longitudinal direction of the collimator 16. The septa 42 form openings or channels 44 with sides 46 which converge downwardly to a focal line 48 parallel to the longitudinal axis of the collimator 16.

Figure 4:
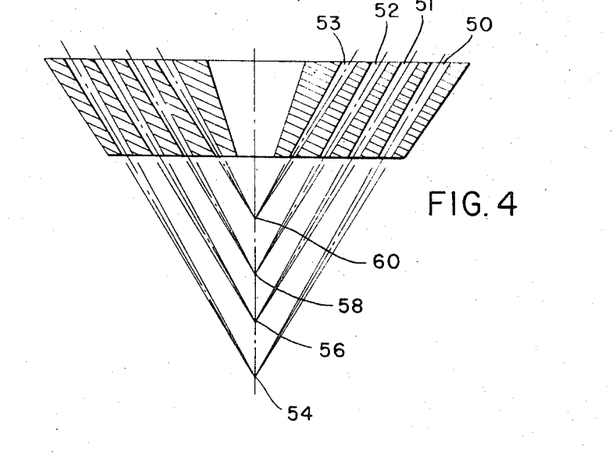
FIG. 4 is a cross-sectional view of an alternate type of collimator.

An alternate embodiment of the collimator is illustrated in FIG. 4 and has pairs of openings 50, 51, 52 and 53 defined by sides which converge downwardly to different focal lines 54, 56, 58 and 60 respectively. The focal lines 54, 56, 58 and 60 are formed along a plane perpendicular to the plane of the collimator in order to allow the collimator to be aimed. A cross-section of the collimator is illustrated in FIG. 4, and focal lines 54, 56, 58 and 60 of the collimator extend the length of the collimator. By utilization of focal lines at different distances from the collimator different depths and areas of viewing can be made simultaneously. With the use of the collimator of FIG. 4, however, it would be necessary to use a pair of scintillation crystals for each pair of openings 50 which meets at a common focal line.

The dimensions of the collimator are selected to provide a desired resolution distance at the focal line and to have a field of view which is as uniform as possible. In practice, focal lengths of 6 to 20 cm have been found to be successful. This collimator is of a general design which is a cross between a focusing collimator and a straight through or non-focusing collimator because it is focusing in one direction and non-focusing in the perpendicular direction. In general collimators are composed of a heavy dense material such as lead.

Figure 5:
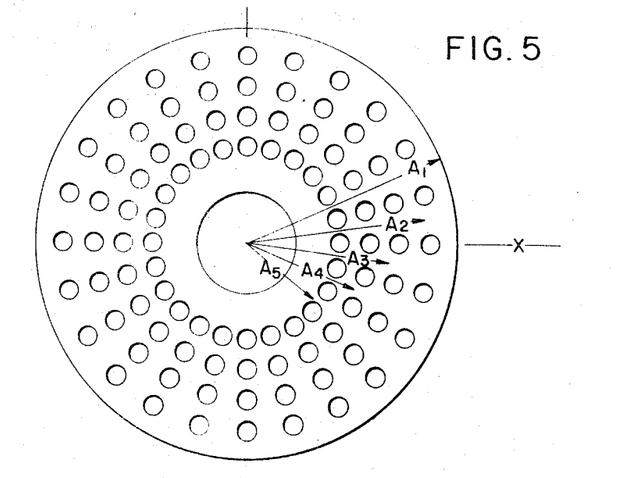
FIG. 5 is a top sectional view of still another alternate type of collimator.

An alternate embodiment of the multiplane collimator of FIG. 4 is shown in FIG. 5 where the shape is circular and a series of channels in a ring form the set that refers to one plane. In this collimator system gamma ray detection consists of a thin circular crystal and an array of photomultipliers as illustrated by the Anger U.S. Pat. No. 3,011,037 which is incorporated by reference herein. A modification to the Anger summing circuit is necessary, however, in order to obtain depth information with this collimator. The Anger method yields coordinate positions $X$ and $y$ of a scintillation as noted in FIG. 5. If, for example, it is desired to consider depth layer 56 of FIG. 4, then only the response for the set of channels 51 is wanted. In order to obtain this response, the output of the Anger system must be transmitted to electrical circuits which add the information as $X^2$ plus $y^2$. If this sum has a value between $A_2^2$ and $A_3^2$ then the scintillation must have occurred from the set of channels 51. In a similar manner any other level can be determined. The net result is that the use of the collimator of FIG. 5 and known circuitry can convert a two-dimensional camera such as Angers to a tomographic camera.

Scintillation Crystal

Figure 6:
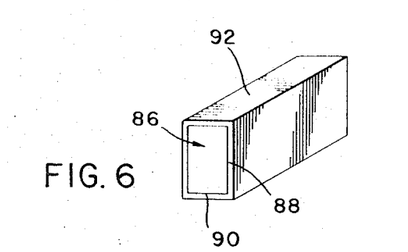
FIG. 6 is a perspective view of the scintillation crystal.
Figure 7:
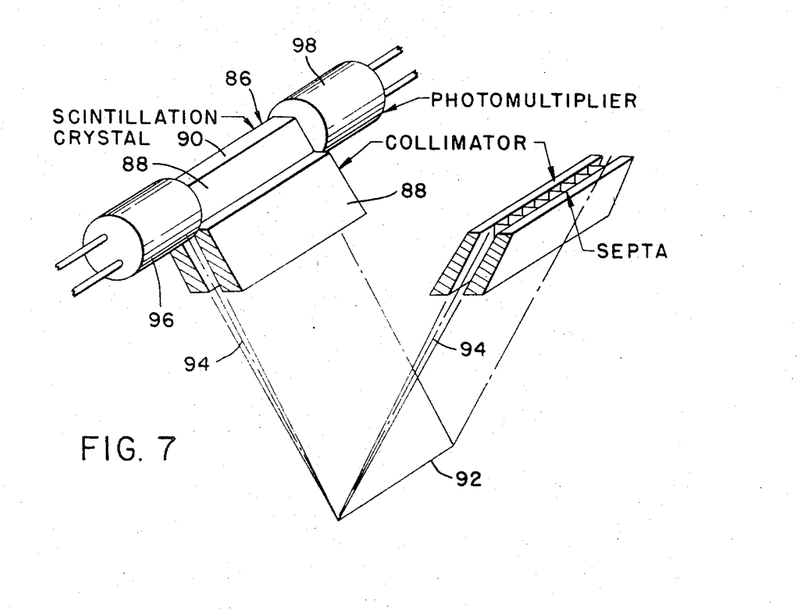
FIG. 7 is a schematic representative of the combined scintillation crystal and collimator.

As illustrated in FIGS. 6 and 7, the scintillation crystal 86 has a generally rectangular cross-section which is uniform along its length. A rectangular cross-section was chosen because of favorable attenuation. Other configurations where the cross-sectional height is different than the width would also be acceptable. The height 88 is greater than the width 90. A range of heights of 1 inch to 2 inches for sodium iodide has been successfully used in this invention. It is anticipated, however, that deviations from this height may also provide successful. The width of the scintillation crystal is approximately 1/2 inch and some deviation may also be made from this dimension. A coating 92 of highly reflective material such as magnesium oxide covers the scintillation crystal 86 in order to decrease the attenuation of radiation within the crystal.

In use, the scintillation crystal 86 is mounted in proximity to the collimator as illustrated in FIG. 7. The collimator 88 is focused to converge at a focal line 92. Radiation received within the wedge-shaped channel 94 is received by and transmitted through the collimator 88 to the scintillation crystal 86 where a scintillation occurs which changes gamma radiation to visible light. While the channel 94 is wedge-shaped, the wedge is really a complex configuration. Its sides converge in a nearly linear fashion but are slightly curved. After the focal line the sides diverge more rapidly than they converged.

The particular geometry of the crystal was chosen because it gave an acceptable range of attenuation and pulse amplitudes.

Electronic System

Figure 8:
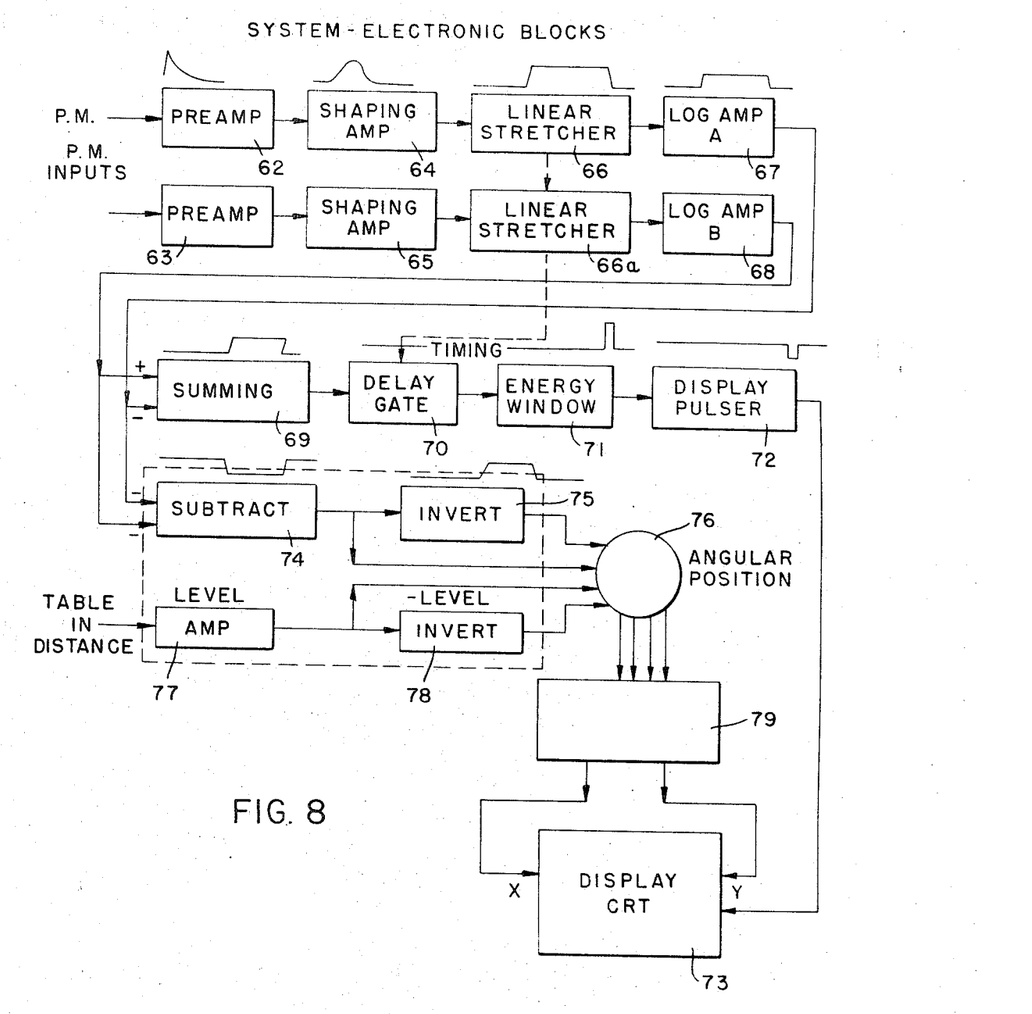
FIG. 8 is a block diagram of the electronic system.

FIG. 8 is a block diagram of the events taking place in the amplifier 26, position selector 28, pulse height selector 30, cathode ray tube 32 and trigger 34. Photomultiplier tubes inputs are received by preamplifier 62 and preamplifier 63 which transmit respectively to shaping the amplifiers 64 and 65. The signals are then stretched by linear stretcher 66 and linear stretcher 6 to a in order to allow enough time for the signal to be manipulated and recombined at a later time. The preamplifier, shaping amplifier and linear stretchers are well known commercially available circuitry which do not form a part of this invention.

The outputs in the linear stretchers are transmitted to logarithm amplifiers 67 and 68. These logarithm amplifiers change the amplitude of the signals received to logarithms of the amplitudes.

Figure 9:
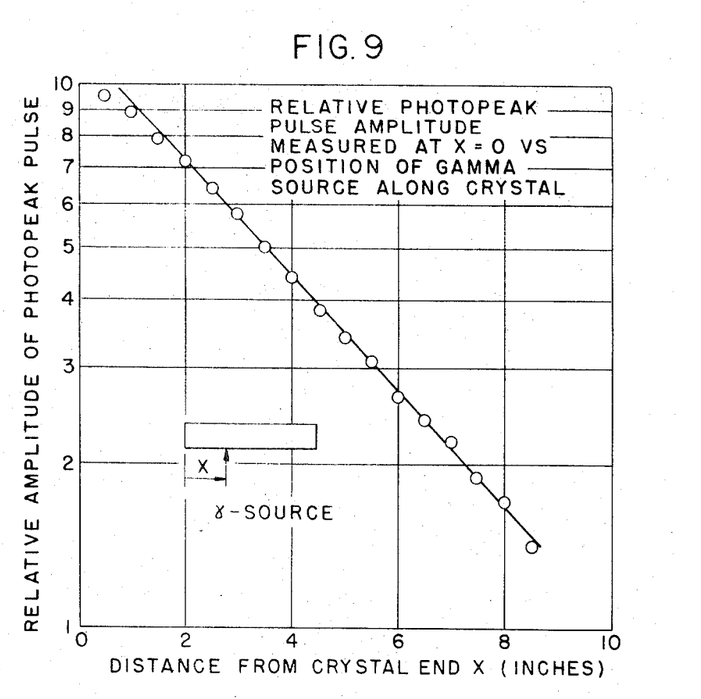
FIG. 9 is a graph showing the relationship of relative amplitudes of photo peak pulses and distances from the crystal end in a scintillation crystal.

The signals received by the photomultiplier tubes 96 and 98 have been illustrated in FIG. 9 in comparison to the distance from the end of the crystal in which the photomultiplier tubes are located. The relative amplitudes of the photo peaks have been graphed on a logarithm scale. The resultant straight line illustrates that the amplitude of the electrical pulses from the scintillations decrease exponentially as the distance of the scintillation from the crystal end increases.

A summing circuit 69 adds the logarithms of the amplitudes. The sum of the logarithms of the amplitudes are then transmitted through a delay gate 70 and energy window 71, which basically form a pulse height selector, through a display pulser 72 and into a display circuit 73. The delay gate, pulse height selector and display pulser are well known in the art.

The output from the logarithms amplifier 67 and 68 are also transmitted to a subtracting circuit 74 to take the difference of the logarithms. The difference of the logarithms are then put through an inverter 75 to a central information input 76 which makes adjustments for different angles of viewing by the collimator. Information concerning the relative position of the scintillation crystal and collimator relative to the source are also transmitted through an amplifier 77 and inverter 78 to the information input 76. The information can then be transmitted to a recording system 79 if desired and finally to a display means 73 which will illustrate the logarithms of the amplitude in a desired range according to the location of the scintillation in the scintillation crystal.

Scanning Process

Figure 11:
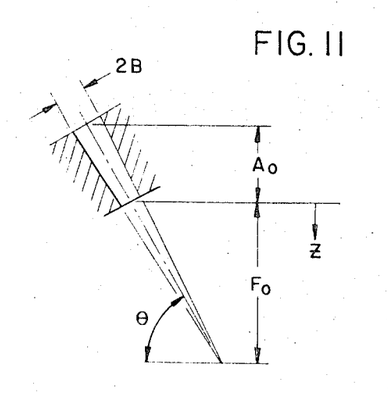
FIG. 11 is a schematic illustration of relation of the collimator and plane of interest.
Figure 12:
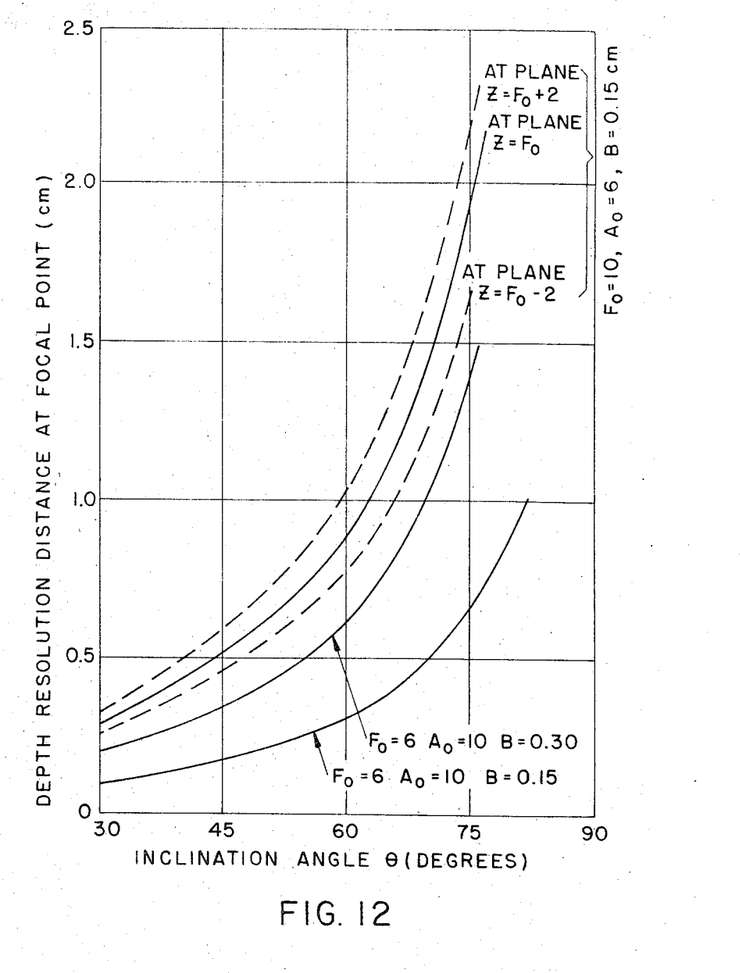
FIG. 12 is a graphical representation of the depth resolution of a collimator versus the angle of inclination of the collimator to the source of radiation.

In order to determine the best angle of observation of the detectors, the depth resolution distance of the collimator was studied in relation to the inclination angle of the collimator to the plane of interest. This angle theta ($\theta$) is shown in FIG. 11. Depth resolution (or resolution distance) is used herein to mean the full width-half-maximum of the point response distance curve. FIG. 12 illustrates the results of a study with different angles and collimators. It was found that the resolution is best for small angles of inclination and gets progressively poorer as the angle theta increases. Physically this means that the depth resolution between two planes is better if you look from a small angle with respect to that plane. However, the collimator's ability to distinguish between two points on a given plane decreases as theta decreases. It was found as illustrated by FIG. 12 that angles of inclination between 30° and 60° were satisfactory. The angle of 45° was chosen for most tests and has given good results. The graph of FIG. 12 also indicates that as the width (B) of the collimator of FIG. 11 decreased, the resolution distance increased. However, as the size of the opening in the collimator decreases, the field of view is simultaneously restricted. An opening of between 15 and 30 millimeters was found to be satisfactory.

Figure 13:
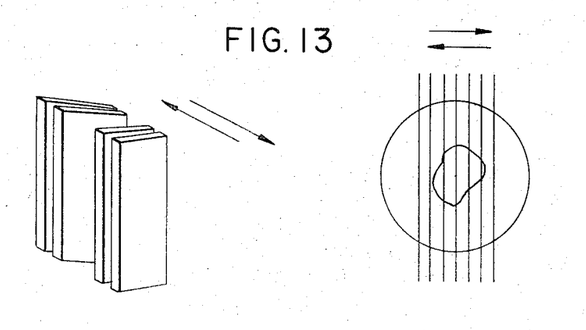
FIGS. 13, 14 and 15 show a scanning procedure.
Figure 14:
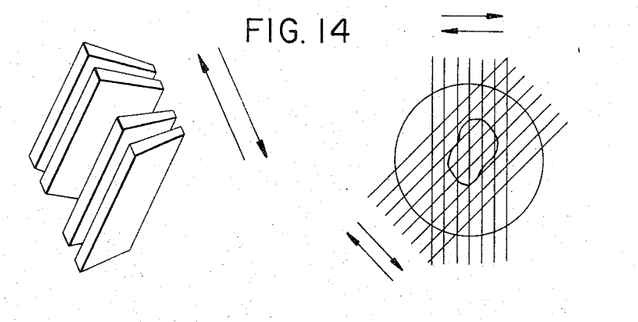
Figure 15:
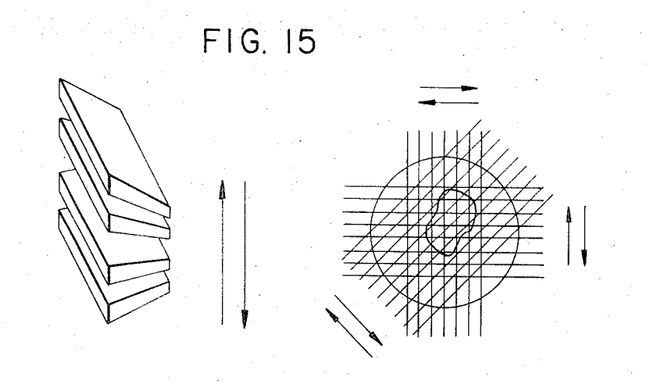

FIGS. 13 through 15 illustrate features of scanning used with the present invention. A scan by the collimators over one area give information along a linear direction through the height of the source of radiation. By scanning across different directions and adding the signals a more defined representation of the source of radiation can be obtained. Variations in the direction of observation can be compensated for with known circuitry in order to give a common reference for combining the information. The width of the scan will normally be equal to the length of the collimator and scintillation crystal. The use of one scintillation crystal which is about 14 inches wide will usually be wider than the source and therefore can scan the area of interest without lateral movements. If greater widths were desired, multiple collimators in a line could be used with appropriate use of photomultiplier tubes.

Figure 10:
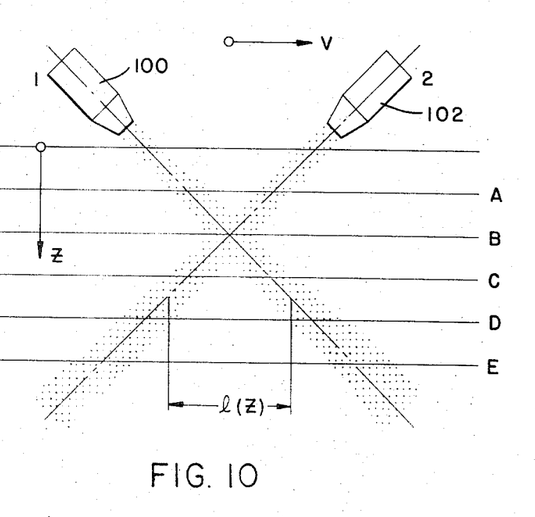
FIG. 10 is a schematic representation of the use of dual collimators in this invention.

FIG. 10 illustrates a simplified representation of two detection units 100 and 102. As defined, the detection units generally include the collimators, scintillation crystals and photomultiplier tubes. As can be seen from FIG. 10 the two detectors 100 and 102 have a reinforcement of their sensing area at plane B. Generally the two detection units are required to move as a unit. The overlap of the fields of view would tend to reinforce the information in the region of plane B if the outputs of both detectors are combined. The same maneuver would naturally lead to a smearing of the other planes. Thus, even though each collimator individually sees all layers of interest simultaneously, a particular layer is selected by providing a greater blurring of surrounding layers. To accomplish this selection and blurring, it is necessary to have two or more collimators with their field of view effectively superimposed at the point of interest. It is important to note, however, that the two collimators of FIG. 1 may represent two single channels of one collimator, one collimator at two different times or two complete collimator systems. The last point is important because it suggests the possibility of focusing attention at several different planes with the information from one pass with a given system by recording information concerning the relative placement of the detector and source.

Tomographic observation can be explained by considering that the two collimators of FIG. 10 are moved as a unit in direct linear fashion. To obtain a reinforcement of plane B, the output of unit 1 is added to the output of unit 2. If reinforcement of another plane, for example, plane A, were desired then the radiation received by detector 100 should be considered when it has effectively moved closer to detector 102. If the information concerning both detectors are stored on magnetic tape, the observations of the detectors can be retrieved for any time or position during their scan. In this manner the detectors can produce the same amount of information as if they were moved relative to one another for observation of different reinforced planes. A time delay summation can be effectivrly used by delaying summation at time $t = 1(2/)v$ where $1(z)$ is the separation of the fields of view at depth $z$ and $v$ is velocity of the scan. It should also be noted that the relative position of the detectors with respect to the source can also be and usually is recorded instead of any time delay. The important point to realize is that the reinforcement of areas occurs because of the relative different positions and directions of observation of detectors 100 and 102. A particular advantage of scanning with the present invention is that the focal line can be made wider than the soruce of radiation. It is therefore necessary to make only one scan to view the entire area and two scans to give a tomographic representation of the source. If a single detector is used and only one pass is made by the scanner the device notes that it receives concentrations of radiation at certain positions. However, with only the use of one scan by a single element, it cannot detect the depth of the radiation. In order to detect the depth of radiation, a second scan must be made from a different direction. This second scan would give the same information of the single scan of a dual detector. By noting the relative positions of the detectors relative to the source and each other, along with the angles of observation, it is a simple matter of geometry and known circuits to detect the depth at which the reinforcement occurs.

It is the distinct advantage of this system that all of the depths of the source can be observed during only the time required by two scans of a single detector or one scan of dual detectors. As explained earlier, either time or positions can be recorded and combined with information on radiation received at those times or positions. In subsequent scans the use of simple geometry and known circuits can be used to find where reinforcement and concentrations of radiation occur from any depth within the source.

If additional scans are desired, they can be made from any direction and angle to reinforce the display image. Similarly, multiple detectors can be used. It is basic that the more radiation that is received by the detector, the better the representation of the radioactive source will be.

Operation

Detector 12, which includes at least one collimator, a scintillation crystal and photomultiplier tubes at each end of the crystal moves relative to the source of radiation. As it moves relative to the source, the collimator senses radiation along its field of view. The radiation is transmitted through the openings 36 (FIG. 3) to the scintillation crystal. In the scintillation crystal the gamma radiation is changed to visible light. Also in the scintillation crystal the bombardment of gamma rays causes radiation due to compton effect. Photomultiplier tubes 20 and 22 therefore receive radiation resulting from both compton and photoelectric effect. The compton effect is generally considered noise and must be eliminated from the system. In order to eliminate the compton effect, as well as to select only a certain amplitude of radiation, the photomultiplier tubes transmit their electric signals to amplifiers 20 and 24. As particularly noted in FIG. 6, the photomultiplier inputs convert the amplitude of the electrical pulses to logarithms of the amplitudes. This conversion to the logarithms is done because as noted in FIG. 9 the logarithms of the relative amplitudes of the photo peaks have a linear relationship with the distance from the crystal end to the scintillation. Thus, if a scintillation occurs at one of the ends of the scintillation crystal the response will be a maximum. By the same token, the photomultiplier tube at the other end of the crystal will have a minimum response.

If the response from both photomultiplier tubes 96 and 98 at the ends of the scintillation crystal were plotted on FIG. 9, it would form a curve or line with the inverse of the slope. That is, the two curves would form an X in the middle of the graph. This graphical representation of the relative amplitudes shows that the combination of the logarithms of the amplitudes from each of the outputs of the photomultiplier tubes will always be substantially constant. For example, if a scintillation occurs at one end of the scintillation crystal where the distance is nearly zero to the photomultiplier tube 96, the amplitude of one photo peak pulse would be about 10 while the amplitude from the other tube 98 would be nearly zero. Near the center both responses would be 5 for a total of 10.

Because the sums of the logarithms of the amplitudes of the electrical signals received from photomultiplier tubes at the ends of the scintillation crystal are substantially constant for a given energy level a very accurate pulse height selection can be made. That is, since any given energy level will produce a constant sum of the logarithms a range of radiation will produce a spectrum of logarithms having a spectrum of amplitudes that are substantially constant regardless of the scintillation position in the crystal.

Previously, pulse photo peak height selection was made before conversion to logarithms. However, because the variation from the end of the crystal was exponential and not linear it was difficult if not impossible to make an accurate pulse height selection. By the use of the conversion of the amplitudes to logarithms of the amplitudes and obtaining a linear distribution, it became possible to sum the logarithms, obtain a constant and make accurate pulse height selection. This relationship can be shown mathematically as $ln\ A_1 = ln\ A_0 - \alpha\ X$ $ln\ A_2 = ln\ A_0 - \alpha\ (L-X)$ where $A_1$ is the amplitude of a pulse received by the first photomultiplier tube, $A_2$ is the amplitude of the pulse received by the second photomultiplier tube for a given distance $X$ of a scintillation along the scintillation crystal having a length equal to $L$. $A_0$ is a constant equal to the response of the photomultiplier tube when $X$ is equal to 0. Alpha ($\alpha$) is a constant and determined by the attenuation of the crystal. Adding logarithms $A_1$ plus logarithm $A_2$ results in $2\ ln\ A_0 - \alpha\ L$ Since $A_0$ is a constant, alpha is a constant and $L$ is a constant the sum of the logarithms is therefore equal to a constant. The attenuation constant is also significant in determining the position of the scintillation within the crystal. Using the same illustration above, if the logarithm $A_1$ is subtracted from logarithm $A_2$, the result is equal to $\alpha L - 2\alpha X$. That is, the difference of the logarithms is directly proportional to a constant times the length of the crystal minus a term proportional to the location ($X$) of any scintillation along the length of the crystal.

This logarithmic proportionality is utilized in the circuitry of FIG. 6. The logarithms amplifier 67 and 68 have their outputs transmitted to a subtraction circuit 74, which in effect gives the distance along the crystal of which the scintillation occurs. With the information now available, that is, the distance along the crystal and the accurately selected pulse heights corresponding to radiation from the source, the inputs can be put into a display circuit.

It should be noted that the relationships illustrated in the mathematics above has a very practical significance as illustrated in FIG. 9. The attenuation factor $\alpha$ is the slope of the curve.

In the selection of the scintillation crystal the attenuation factor must be adjusted to give a slope which gives finite and easily detectable differences and sums of logarithms for different scintillation locations.

Specifically, if the slope in FIG. 9 were very small the curve would be nearly horizontal. Differences in length would make no significant difference in the logarithms of the amplitudes and therefore the positions of scintillations would be impossible to determine. On the other hand if the slope governed by the attenuation constant were very large and the curve were steep the uncertainty in the amplitude of the photo peaks at lower relative amplitudes becomes so great that position is again difficult to determine. This latter difficulty can be circumvented by shifting the entire curve upward so that the smallest relative amplitude is still large enough to yield an acceptable uncertainty.

The shape of the scintillation crystals was chosen to give an attenuation factor which would produce an acceptable slope to give realistic differences of the logarithms of the amplitudes so they could be detected as well as to give enough amplitudes to maintain an acceptable uncertainty. In order to accomplish these ends the scintillation crystal was chosen to have a rectangular shape with a height of approximately 1 to 2 inches and a width of approximately 1/2 inch. This particular shape gave an attenuation constant which was satisfactory. In order to keep the amplitude of the pulses within the scintillation crystal at a relatively high level so they could be detected with acceptable uncertainty the scintillation crystal was covered with a high reflective coating such as magnesium oxide.

It should be understood that while the above described preferred embodiments give specific details, modifications will be available to those knowledgeable in the art. For example, scintillation crystals could possibly be replaced by more sophisticated, solid state items which translate gamma radiation to visible light radiation.

I claim:

1. The process of tomographic scanning with a detector having a linearly focused collimator transmitting radiation to a scintillation crystal and at least one photomultiplier tube to determine patterns of radioactivity from a source having a plane of interest comprising:

making a first scan at a first angle from the plane of interest of the source while sensing at each position a line of radiation emanating from different depths and areas within the source;

detecting an area of radiation as the linearly focused collimator makes the first scan;

recording information concerning the first scan;

making a second scan at a second angle from the plane of interest of the source while sensing at each position a line of radiation emanating from different depths and areas within the source;

detecting an area of radiation as the linearly focused collimator makes the second scan;

recording information concerning the second scan;

electronically combining the information from the first and second scans to determine patterns of radiation at different depths and areas within the source.

2. The process of claim 1 wherein the radiation is sensed along a wedge-shaped channel through the source for each position during the scan.

3. The process of claim 2 wherein radiation is sensed at an angle between 30° and 60° from the plane of interest during the first scan and from an angle between 30° and 60° from plane of interest during the second scan but the angle of sensing being in a different direction from the first scan.

4. The process of claim 3 wherein radiation is sensed during the first scan of substantially 45° and during the second scan of substantially 45°.

5. The process of claim 2 wherein the information recorded during the scans includes the relative position at which the radiation is sensed relative to the source and the amount of radiation sensed by the detector at that location.

6. The process of tomographic scanning with a detector having dual linearly focused collimators transmitting radiation to dual scintillation crystals and at least two photomultiplier tubes to determine patterns of radioactivity from a source having a plane of interest comprising:

making a scan relative to the source while sensing from a first and second angle from the plane of interest lines of radiation emanating from different areas and depths within the source;

detecting a first and second area of radiation during the scan;

recording information concerning the scan including the radiation sensed from the different directions and information relating to the relative positions at which the radiation is sensed;

electronically combining the information to determine patterns of radiation at different depths and areas in the source.

7. The process of claim 6 wherein the radiation is sensed along a wedge-shaped channel through the source for each direction of sensing and each point during the scan.

8. The process of claim 7 wherein fields of view are relatively well defined channels.

9. The process of claim 8 wherein the radiation is sensed at an angle of between 30° and 60° from a chosen plane in the source.

10. The process of claim 9 wherein the radiation is sensed at 45° from the plane of interest.

* * * * *